Nov. 24, 1964
E. E. ALLAN
3,158,235
MANUALLY OPERABLE SLACK ADJUSTER FOR VEHICLE BRAKES
Filed Dec. 20, 1962
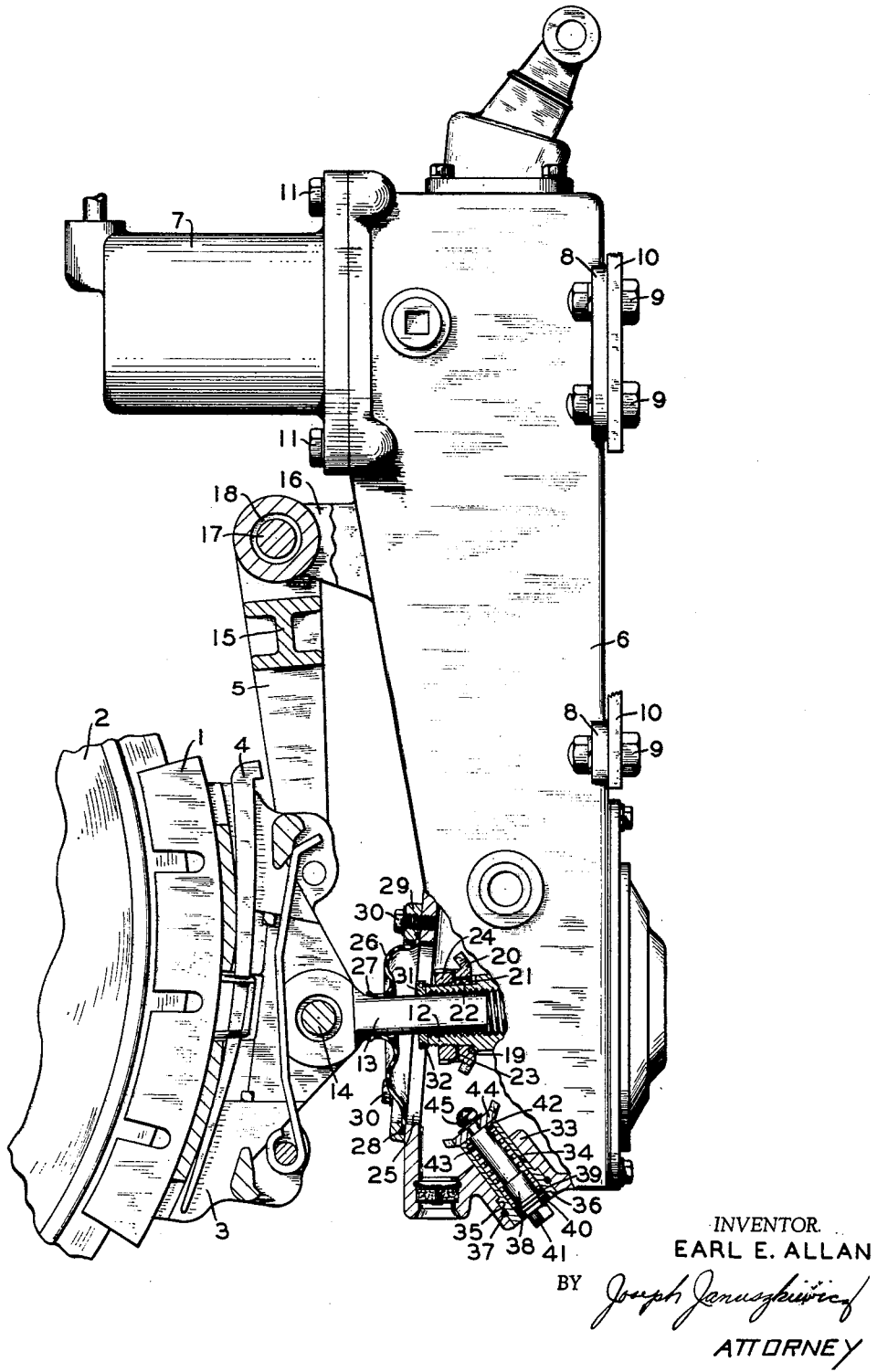
INVENTOR.
EARL E. ALLAN
BY *Joseph Januszkiewicz*
ATTORNEY

United States Patent Office 3,158,235
Patented Nov. 24, 1964

3,158,235
MANUALLY OPERABLE SLACK ADJUSTER FOR
VEHICLE BRAKES
Earl E. Allan, Pitcairn, Pa., assignor to Westinghouse
Air Brake Company, Wilmerding, Pa., a corporation of
Pennsylvania
Filed Dec. 20, 1962, Ser. No. 246,051
1 Claim. (Cl. 188—197)

This invention relates to slack adjuster mechanisms for railway braking apparatus and more particularly to a manually operable slack adjusting mechanism for a unitary or "package" type wheel tread brake assembly for railway car trucks.

There is shown in Patent 2,940,554, issued June 14, 1960, to Mortimer B. Cameron and assigned to the assignee of the present application, a form of unitary type tread brake assembly for railway car trucks embodying manually operable slack adjusting means for varying the distance between a brake shoe and the tread of a corresponding car wheel by adjusting the length of a rigid brake shoe actuating rod member, formed by threadedly interengaging rod and sleeve elements, that constitutes one link of a linkage movably supported in a unitary casing and operatively connecting the piston rod of a brake cylinder piston to a brake-shoe-carrying brake head that is suspended from the exterior of the unitary casing by a brake head hanger.

The manual slack adjusting means described in the hereinbefore-mentioned patent for varying the distance between a brake shoe and the tread of a corresponding car wheel is subject to the disadvantage of lack of ready accessibility by repairmen or other railroad maintenance personnel, due to limitations of space in consequence of the manner of mounting the unitary brake assembly on a car truck.

Accordingly, it is the general purpose of this invention to provide in a "package" type wheel tread brake assembly a simple and low cost manually operative slack adjusting means that is readily accessible to railway service people from the underside of a railway car truck, and which is normally out of operative relation to the operating linkage of the brake assembly.

This invention comprises a manually operative clutching and declutching mechanism, one member of which is secured to an internally threaded sleeve member in which is received a non-rotative screw member that is connected at one end to the brake head of the "package" brake unit, the sleeve member and non-rotative screw member together comprising a rigid rod member that constitutes one link of the linkage connecting the piston rod of the "package" brake unit to the corresponding brake-shoe-carrying brake head. Subsequent to operation of the manually operative mechanism to a clutching position, a railway repairman may manually effect rotational movement of the sleeve member relative to the non-rotative screw member to thereby change the length of the rigid rod member and correspondingly the distance between the brake shoe and the tread of the corresponding car wheel to provide the proper clearance therebetween, as when replacing a worn brake shoe with a new brake shoe.

After the proper brake shoe clearance is obtained, the repairman may operate the mechanism to a declutched position whereupon the movement of the rigid rod member is entirely independent thereof.

In the accompanying drawing:

The single figure is a side elevational view partially in section of a brake unit embodying the invention, showing the brake applying linkage containing a manually operable clutching and declutching mechanism for taking up and letting out slack.

Description

As shown in the drawing, a pneumatic brake unit, one of which is provided for each wheel of a railway passenger car truck, is secured, as by several bolts and nuts, to a pair of bosses formed integral with the side frame of the truck.

As shown in detail in the drawing, the brake unit comprises a brake shoe 1 for movement into braking contact with the tread of a wheel 2 of the car truck, a brake head 3 to which the brake shoe 1 is secured, as by a key 4, an external brake head hanger 5, and a sectionalized casing comprising a main section 6 and a brake cylinder section 7.

Formed integral with the main casing section 6 is a pair of bosses 8, provided with several spaced-apart bores for receiving a like number of bolts 9 whereby the main section 6 is rigidly secured to a pair of angle brackets 10 attached as by welding to a side frame (not shown) of a passenger car truck.

The brake cylinder casing section 7 is cylindrical in form and separably secured, as by cap screws 11, to one side of the main casing section 6 in registry with an opening (not shown) in the side wall of the main casing section 6.

Slidably operable in a bore (not shown) in the casing section 7 is a fluid pressure actuated brake applying piston that is connected by a linkage movably supported in the main casing section 6 to the brake-shoe-carrying brake head 3, as fully described in the hereinbefore-mentioned Patent 2,940,554.

As described in detail in said patent, the above-mentioned linkage comprises a lever (not shown) that has a universal joint type of connection with an internally threaded sleeve member 12. A brake rod 13 threaded at one end has screw threaded engagement with the internally threaded sleeve member 12, and at the other end is pivotally connected to one end of the brake head hanger 5 and the brake head 3, as by a bolt 14 and a nut (not shown). The brake hanger 5 comprises two identical parallel links connected intermediate their ends by an H-shaped web 15 formed integral therewith. The upper ends of the two parallel links are disposed respectively on the opposite sides of a bracket 16 that is formed integral with the main casing section 6, and are suspended from the bracket 16, as by means of a bolt 17. Suitable anti-friction bushings 18 are disposed in a bore in each of the links and in a bore in the bracket 16. The bolt 17 is received within the bushings 18 in the links and the bracket 16 and is secured against removal from the position in which it is shown in the drawing by a nut and washer (not shown).

The left-hand end of the internally threaded sleeve member 12 is provided with a portion of reduced diameter, the right-hand end of which constitutes a shoulder 19 against which rests one side of a bevel gear 20. The bevel gear 20 is secured to the portion of reduced diameter of the internally threaded sleeve member 12 by means such as a key 21 that is disposed in a keyway 22 formed in the portion of reduced diameter and a slot formed in the bevel gear 20. A lock washer 23 is forced against the left-hand side of the bevel gear 20 by a lock nut 24 that has screw threaded engagement with corresponding external screw threads formed on the left-hand end of the sleeve member 12.

As shown in the drawing, the left-hand end of the brake rod 13 extends through an opening 25 in the left-hand wall of the main casing section 6 to the exterior thereof. In order to prevent the entrance of water, ice, and dirt to the interior of the main casing section 6, a rubber dust boot 26 surrounds the opening 25 in the main casing section 6. The boot 26 is provided with an inner bead 27 which fits against the outer periphery of the brake rod 13 to form a seal therewith and with an outer bead 28 that fits in a groove formed in one side of a dust boot retaining ring 29 that surrounds the opening 25 and is secured to the main casing section 6 by a plurality of cap screws 30.

Since the left-hand end of the sleeve member 12 is provided with external screw threads, in order to prevent damage to the boot 26 by these screw threads, a split type dust boot protector ring 31 surounds the brake rod 13 and abuts the left-hand end of the sleeve member 12. The split type dust boot protector ring 31 is provided with a peripheral annular groove in which is disposed a protector retaining ring 32 which acts to cause the split type dust boot protector ring 31 to firmly griup the periphery of the brake rod 13 and thereby prevent movement of the protector ring 31 along the brake rod by vibration.

Formed integral with the lower end wall of the main casing section 6 is a boss 33 the axis of which forms an acute angle with the axis of the brake rod 13. The boss 33 is provided with a bore 34 and a coaxial counterbore 35 the axes of which are the same as the axis of the boss 33.

Disposed in the bore 34 and coaxial counterbore 35 is a hollow bearing shaft 36 which is retained therein by an O-ring seal 37 that is disposed in a peripheral annular groove formed on the hollow bearing shaft 36 and a corresponding internal annular groove formed in the wall of the counterbore 35.

Slidably mounted in the hollow bearing shaft 36 is a driver gear shaft 38 having adjacent its lower end, as viewed in the drawing, a piston 39 that is provided with a peripheral annular groove in which is disposed an O-ring seal 40 for sealing and sliding contact with the interior wall of the hollow bearing shaft 36. Formed on the lower end of the driver gear shaft 38 is a polygonal boss or head 41 adapted to receive an extension type socket wrench for a purpose hereinafter made apparent.

Disposed in surrounding relation to the driver gear shaft 38 and interposed between the piston 39 and an inturned flange 42 formed at one end of the hollow bearing shaft 36 is a spring 43 for normally biasing the driver gear shaft 38 and piston 40 to the position in which they are shown in the drawing, in which position one side of a second bevel gear 44 secured to a reduced end portion of the driver gear shaft 38 by a nut 45 rests against the outside face of the inturned flange 42.

*Operation*

From the drawing, it is apparent that the axis of the brake actuating rod 13 and therefore the axis of the bevel gear 20, and the axis of the driver gear shaft 38 lie in the same plane and intersect so as to form therebetween an acute angle. Furthermore, it is apparent that a repairman may first apply the end of an extension type socket wrench to the head 41 and subsequently exert a push thereon to thereby move the driver gear shaft 38 and the bevel gear 44 carried thereon in a direction upward and toward the left hand until the bevel gear 44 is moved into engagement with the bevel gear 20, it being understood that these gears are of the proper size as to provide for such engagement. While the bevel gears 20 and 44 are thus engaged they constitute a pair of acute angle bevel gears connecting two intersecting shafts constituted by the internally threaded sleeve member 12 and the driver gear shaft 38, respectively.

Now let it be supposed that while the brakes are released, a new brake shoe is secured to the brake head 3 by the key 4 and a repairman desires to adjust the length of the brake rod 13 to obtain the desired standard clearance between the tread of the wheel 2 and the braking surface of the brake shoe 1 which now occupies its brake release position.

The length of the brake rod 13 may now be adjusted to the desired length to provide the standard clearance between the tread of the wheel 2 and the braking surface of the brake shoe 1 by manual rotation of the extension type socket wrench in one direction or in an opposite direction, accordingly as it is necessary to increase the length of the brake rod 13 to move the brake shoe 1 toward the tread of the wheel 2 or to decrease the length of the brake rod 13 to move the brake shoe 1 away from the tread of the wheel 2, until the desired clearance between the tread of the wheel 2 and the braking surface of the brake shoe 1 is obtained.

When the desired clearance between the tread of the wheel 2 and the braking surface of the brake shoe 1 is obtained, the repairman stops rotating the socket wrench and, after easing up on the inward pushing thereon, removes it from the head 41. The spring 43 thus acts to first move the bevel gear 44 out of engagement with the bevel gear 20 and thereafter return the bevel gear 44, the driver gear shaft 38 and piston 39 to the position in which they are shown in the drawing.

As the brakes are subsequently applied and released, the automatically operative slack adjusting mechanism shown and described in the hereinbefore-mentioned Patent 2,940,554 will operate to adjust the length of brake rod 13 in the manner fully described therein in response to the wearing away of the brake shoe 1 to maintain constant the required clearance between the tread of the wheel 2 and the braking surface of the brake shoe 1 when the brake shoe occupies its brake release position.

When the brake shoe 1 has completely worn out and it is to be replaced with a new shoe, it is necessary to reduce the length of brake rod 13 since the thickness of the new brake shoe is greater than that of the worn shoe. The length of brake rod 13 may thus be reduced by a repairman applying a socket wrench to the head 41 and performing the heretofore described operation.

While the automatically operative slack adjusting mechanism shown and described in the hereinbefore-mentioned Patent 2,940,554 is not shown in the drawing of the present application, it will be understood that the "package" type wheel tread brake assembly of the present application includes such an automatic slack adjusting mechanism and that my novel manually operative slack adjuster mechanism functions compatibly with such automatic slack adjusting mechanism.

Having now described the invention, what I claim as new and desire to secure by Letters Patent, is:

A unitary type wheel tread brake assembly for applying a braking force to a wheel of a railway car truck, said brake assembly comprising, in combination:
  (a) a casing immovably secured to the car truck,
  (b) a brake-shoe-carrying brake head movably mounted on said casing,
  (c) power means for actuating said brake-shoe-carrying brake head including a movable brake rod having threadedly interengaging rod and sleeve elements, and
  (d) a manually operable slack adjuster mechanism carried by said casing and comprising:
     (i) a first clutch member carried by and secured to the sleeve element of the brake rod intermediate the ends of said sleeve element for effecting rotation thereof with respect to the rod element to vary the length of the brake rod, (ii) a rotary shaft mounted in said casing in a position below and at an angle to said sleeve element and shiftable axially, (iii) a second clutch member carried at one end of said shaft, (iv) biasing means for normally biasing said shaft axially to a position in which said second clutch member is out of clutching engagement with said first clutch member, and (v) manually operable means carried at the other end of said shaft and accessible from beneath the car truck for effecting shifting of said shaft axially against the yielding resistance of said biasing means to cause engagement of said clutch members and for effecting rotation of said clutch members while engaged.

References Cited in the file of this patent

UNITED STATES PATENTS

| | | |
|---|---|---|
| 2,294,974 | Freeman | Sept. 8, 1942 |
| 2,337,756 | Larson | Dec. 28, 1943 |
| 2,913,071 | Mueller | Nov. 17, 1959 |
| 2,922,317 | House | Jan. 26, 1960 |
| 2,940,554 | Cameron | June 14, 1960 |

FOREIGN PATENTS

| | | |
|---|---|---|
| 576,613 | Great Britain | Apr. 11, 1946 |